Dec. 26, 1950    E. G. HONKANEN    2,535,288
PRESSURE SEAL
Filed Sept. 12, 1947
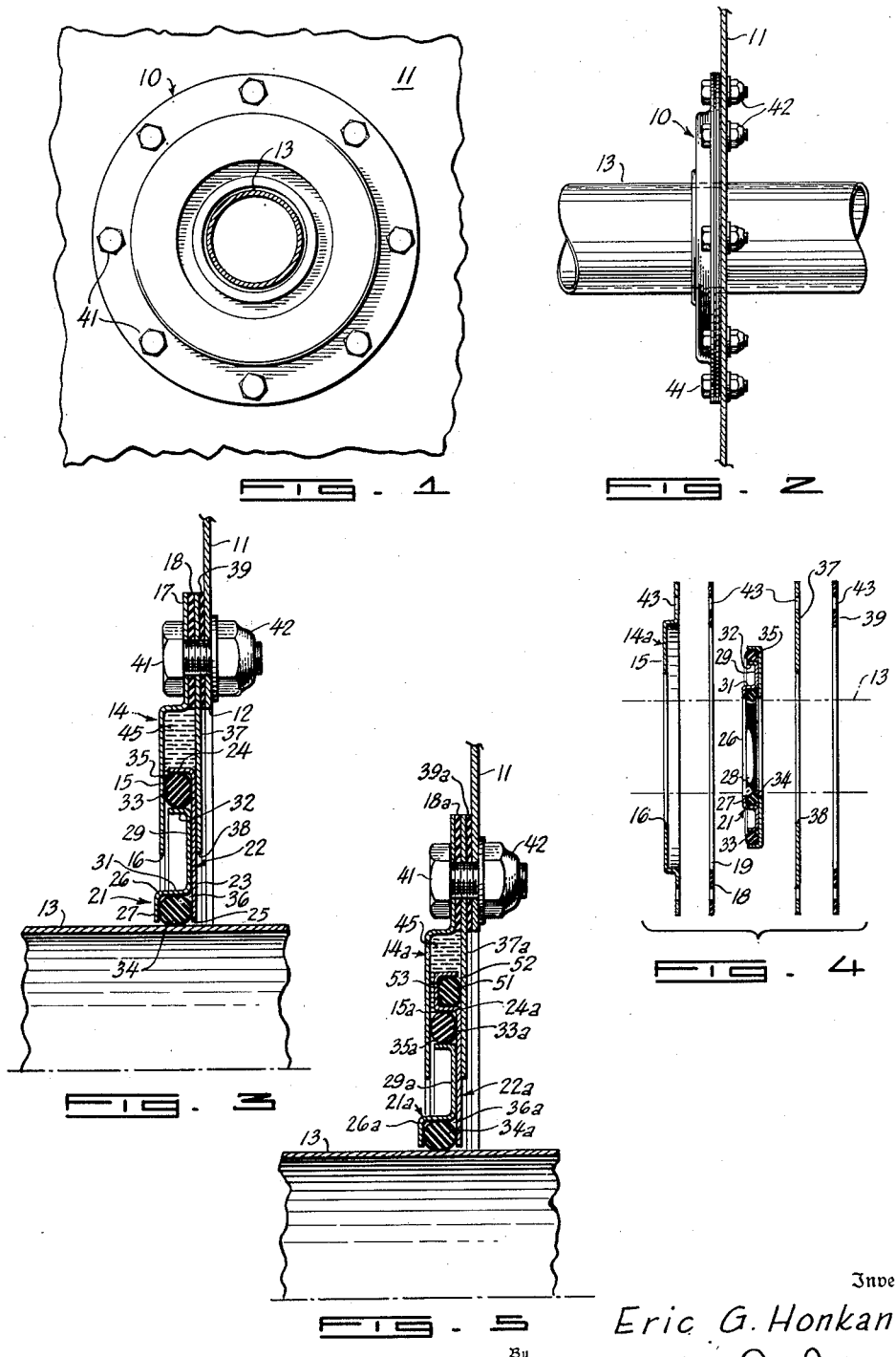
Inventor
Eric G. Honkanen
Walter J. Jason
Attorney Patented Dec. 26, 1950

2,535,288

UNITED STATES PATENT OFFICE 2,535,288

PRESSURE SEAL

Eric G. Honkanen, San Diego, Calif., assignor to Consolidated Vultee Aircraft Corporation, San Diego, Calif., a corporation of Delaware Application September 12, 1947, Serial No. 773,719

9 Claims. (Cl. 286—15)

This invention relates to sealing means and more particularly to improved pressure seals for use with shafts, cables and the like.

To render aircraft which are designed to fly at high altitudes comfortable and livable for flight personnel and passengers, it is necessary to pressurize the aircraft cabin. Pressurization increases the pressure in the cabin and simulates those altitudes which the human body can comfortably tolerate. Cabin pressurization however propounds problems and difficulties in the construction of the aircraft at those points where control cables, shafts, torque tubes, and other like movable elements are required to pass through a wall or skin which divides the pressurized area of an aircraft from the non-pressurized, or atmospheric area. At such points care must be taken that loss of air therethrough is prevented or at least held to a minimal amount that can be cared or compensated for by the pressurization system.

This invention has as its primary object the provision of an improved form of pressure seal for use with pressurized devices which is adapted to cooperate with control elements such as a tube or shaft to permit the passage thereof through a wall separating a pressurized region from a non-pressurized region or a region of lower pressure without a detrimental loss of pressure and air from the pressurized region.

Another object of the invention is to provide in a pressurized device an improved form of pressure seal for use with a tube or shaft which allows for rotational and/or oscillatory movements of the tube or shaft with a minimum loss of air pressure therebecause.

A further object of the invention lies in the provision of a pressure seal for use with a tubular and shaft-like members which permits of misalignment of such members while retaining its sealing effectiveness.

A still further object of the invention is the provision of a pressure seal for use with control elements which is light weight, has simplicity, is inexpensive, and which is easy to fabricate and install.

Other objects and features of the invention will be readily apparent to those skilled in the art from the following specification and appended drawings illustrating certain preferred embodiments of the invention in which:

Figure 1 is an end view of the pressure seal according to the present invention and in operative position on a dividing wall;

Figure 2 is a side elevational view of the pressure seal of Figure 1;

Figure 3 is a half section view illustrating details of the pressure seal of Figure 1;

Figure 4 is an exploded view illustrating the component parts of the pressure seal of the present invention; and Figure 5 is an illustration of a half section of a modified pressure seal.

Having particular reference now to the drawings, there is shown illustrated the pressure seal of the present invention which is indicated generally at 10 and disposed or mounted on an aircraft wall 11, adjacent an access opening 12 provided in wall 11. A control element 13, which by way of example in this particular application is to be considered to be a torque tube, extends through opening 12, passing from a non-pressurized area on one side of the wall 11 to a pressurized area on the opposite side thereof.

The pressure seal 10 consists essentially of a generally cup-shaped housing 14 having a base 15 with an annular opening 16 therethrough and a peripheral flange 17; a sealing disk 18 of rubber or other sealing material having an opening 19 therethrough; an inner assembly 21 comprising a generally cup-shaped member 22 with a base 23 parallel to base 15 of housing 14, an annular wall or flange 24 and a central aperture 25 through base 23, and a clamping ring 26 disposed within the cup-shaped member 22 and welded thereto, the clamping ring 26 comprising an annular base 27 with a central opening 28 and an annular channel portion 29 which includes an inner flange or wall 31 and an outer flange or wall 32. The inner assembly 21 includes a pair of annular elastic packing or sealing rings 33 and 34 which are normally substantially circular in cross-section and which may be comprised of leather, rubber, synthetic rubber or other suitable material. The sealing ring 33 is confined in an annular groove 35, the side walls of which are defined by the annular wall 24 of member 22 and the annular outer wall 32 of clamping ring 26 spaced therefrom, and which walls are, as shown, disposed in parallel relationship and extend in the same direction. The groove 35 is substantially rectangular in cross-section. The second annular ring 34 is disposed contiguous to the inner annular wall 31 of the clamping ring 26, and as illustrated the ring 34 is contained in a second annular groove 36. Groove 36 is rectangular in cross-section and is formed by the cooperation of the base 23 of cup-shaped member 22 and the base 27 of clamping ring 26, which bases define the parallel side walls of the groove. It is noted that the groove 36 faces in a direction at right angles to that which groove 35 faces.

A metallic disk 37 having a central aperture 38 is disposed rearwardly of inner assembly 21, which inner assembly 21, as shown in the drawings, is of smaller diameter than opening 12 in wall 11. Disk 37 acts as a cover element to cooperate with housing 14 to contain or confine the inner assembly 21 within the housing. Cover 37, as shown, lies parallel to base 16 of housing 14 and base 23 of member 22. A centrally apertured sealing disk 39 of rubber or other sealing material is fitted rearwardly of metallic disk 37 to complete the preferred embodiment of the pressure seal 10.

The pressure seal 10 is shown mounted to wall 11 by a plurality of bolts 41 and nuts 42 annularly arranged, with the bolts 41 passing through aligned openings 43 provided in the flange 17 of housing 14, sealing disk 18, metallic disk 37, sealing disk 38 and wall 11.

Figure 3 best illustrates the positions assumed by the various elements comprising the pressure seal 10 when it is assembled and mounted to the outer surface of wall 11. The pressure seal 10 lies in a non-pressurized area and the control element or torque tube 13 extends through the sealing ring 34 from the non-pressurized area, which lies to the left of wall 11 as viewed in Figure 3, to the pressure area at the right of wall 11. As illustrated in the assembled position of pressure seal 10, groove 36 opens onto the exterior face of the torque tube 13 and the groove 35 opens onto the inner face of base 15 of housing 14. Seals 33 and 34, carried within rectangular grooves 35 and 36 respectively, will in the operative position of pressure seal 10 be compressed or deformed into the space of their respective containing grooves so that the friction or pressure of the sealing rings against base 15 and torque tube 13 will be sufficient to prevent the flow of air from one side of wall 11 to the other. It is noted that the inner assembly 21 will have a limited movement in the direction of the longitudinal axis of the torque tube 13. Pressure applied from the pressurized area to the base 23 of the cup-shaped member 22 will tend to move inner assembly 21 into housing 14 to bring sealing ring 33 into tight engagement with base 15 to prevent the escape of air therearound. Disposed in housing 14 and surrounding the inner assembly 21 is a quantity of grease or similar lubricant as indicated generally at 45. The presence of the grease permits the free and ready transverse and rotative movement of the inner assembly 21 within the housing 14, for the cup-shaped member 22 is allowed to slide readily upon cover 37. The compression or deformation of the annular sealing ring 34 by the torque tube 13 provides a connection between the torque tube 13 and the inner assembly 21, the frictional force being sufficiently great to tie the two together for common movement whereby rotative movement of the torque tube 13 will provide rotative movement of the inner assembly 21.

The various openings through base 15 of housing 14, metallic disk 37, sealing disks 18 and 39 are larger in diameter than the openings through member 22 and clamping ring 26 of the inner assembly 21 so that the inner assembly is adapted freely to move laterally in housing 14 whereby the torque tube 13 may be located eccentrically relative to pressure seal 10. The drawings illustrate a co-axial location of the torque tube 13 relative to the pressure seal 10. In the transverse movement of inner assembly 21 within housing 14 it is understood that the seal provided by the sealing rings 33 and 34 is effectively maintained.

The sealing disk or gasket 18 between the flange 17 of housing 14 and metallic disk 37 acts to prevent leakage of the grease from the housing 14. The sealing disk or gasket 39 provided between the metallic disk 37 and the defining wall 11 of the pressurized compartment tends to prevent leakage of air around the edges of the pressure seal 10.

The torque tube 13 with which the pressure seal 10 is associated may be utilized to drive or operate a flap, aileron, or other control surface or member to be moved and which is located outside of the pressurized area. The pressure seal 10 of the present invention is designed to permit free rotative movement of the torque tube 13 while maintaining an effective seal. Further the torque tube 13 may be misaligned to a small degree relative to the sealing rings 33 and 34 without the incurrence of serious air leakage. In addition the torque tube 13 may assume an oscillatory or axial movement without detrimental effect for the tube 13 can move in ring 34 and the frictional engagement therebetween will be maintained to provide an effective seal.

The pressure seal 10 is so constructed that it requires no special type of torque tube for use therewith nor does it require any protection for the tube at the point that it passes through the pressure seal. This permits for the utilization of stock tubing and minimizes the cost of pressure seal installation.

As pointed out hereinbefore the pressure seal 10 is not limited to use only with torque tubes as it is readily seen that it can accommodate any tubular element, shaft or cylinder, whether the device is co-axially or eccentrically located relative to the seal 10 and whether it rotates, moves transversely or oscillates longitudinally without the sealing effect being destroyed.

The torque tube 13, therefore, is to be taken as being illustrative only of one form of device adapted to be passed from a pressurized area to a non-pressurized area and to which the pressure seal 10 is applicable for preventing leakage therearound.

The pressure seal illustrated in Figure 5 differs from the preferred embodiment in that in the latter the positive pressure is applied from the right, as viewed in the drawings, while in the modification the positive pressure may be applied at either side of the pressure seal. This modified pressure seal may be used in applications where the pressure is sometimes higher at one side and at other times is higher at the other side. The modified pressure seal of Figure 5 is similar in all respects to the preferred embodiment hereinbefore described differing therefrom only in the provision of a means for holding a third sealing ring. The modified pressure seal therefore comprises a housing 14a having a base 15a within which is movably disposed an inner assembly 21a maintained in operative position in housing 14a by a metallic disk or cover 37a. Sealing disks or gaskets 18a and 39a are disposed on either side of the metallic disk 37a. The inner assembly 21a comprises a generally cup-shaped member 22a having an annular wall 24a, and a clamping ring 26a disposed within the cup-shaped member 22a having a channel portion 29a. Grooves 35a and 36a are provided which contain annular sealing rings 33a and 34a. A third sealing ring 51 is provided. This sealing ring 51 is substantially circular in cross-section and is adapted to fit within a substantially rectangular groove 52 effected by an annular channel portion 53 provided at the periphery of generally cup-shaped member 22a. The groove 52 as shown faces oppositely to the groove 35a and is similarly directed at right angles to groove 36a. The sealing ring 51 is adapted to engage the metallic disk 37a when pressure should be applied to the pressure seal from the left, as viewed in Figure 5. If the positive pressure exists to the right of the modified pressure seal the sealing ring 33a will be forced against the base 15a to effectively seal against air leakage. Thus seal 51 is primarily effective when the positive pressure area is at the left of the pressure seal and if any air should leak past seal 33a seal 51 will contain it. In like fashion seal 33a is primarily effective when the positive pressure area is at the right of the pressure seal and will effectively prevent leakage of any air that might escape past seal 51.

The invention exemplifies an improved sealing device adapted for use with control elements which pass through a separating wall between a pressurized area and a non-pressurized area or an area having a lesser pressure and which prevents the escape of leakage of air around the control element. The provision of a housing within which is located a movable sealing assembly comprising a plurality of elastic packing-rings, each located in its own groove or channel which groove or channel faces or opens in a different direction than do the other grooves or channels effects a sealing device which is very effective in operation and which is particularly easy of assembly and installation at the desired location. The control element accommodated by the pressure seal of the present invention is permitted to freely rotate and to have a transverse movement without affecting the sealing qualities and effectiveness of the pressure seal. Further the control element may be misaligned somewhat without the incurrence of detrimental leakage.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A sealing unit comprising a generally cup-shaped housing having a centrally apertured base portion, a centrally apertured sealing assembly disposed within said housing and transversely and rotatively movable therein, and a centrally apertured cover means to maintain said sealing assembly within said housing, said sealing assembly comprising a first member having a centrally apertured base portion and an annular wall portion, a second member having an apertured base portion and an annular wall portion which wall portion is positioned spaced from said first member's annular wall portion and cooperates therewith to form an annular groove, with said base portion of said second member positioned spaced from a part of said first member's base portion and cooperating therewith to provide a second annular groove, one of said grooves opening onto the base portion of the housing and the other of said grooves opening onto the aperture through the sealing assembly, and an elastic sealing ring provided in each of said annular grooves, the sealing ring in said groove opening onto the base portion of the housing having a sealing engagement with said base portion and the sealing ring disposed in the groove opening onto the aperture through the sealing assembly having a sealing engagement with a member passed through said aperture.

2. A sealing unit comprising a generally cup-shaped housing having a centrally apertured base portion, a centrally apertured sealing assembly disposed within said housing and transversely and rotatively movable therein, and a centrally apertured cover member to maintain said sealing assembly within said housing, said sealing assembly comprising a first member having a centrally apertured base portion and an annular wall portion, a second member having a centrally apertured base portion and an annular wall portion which wall portion is positioned spaced from said first member's annular wall portion and cooperates therewith to form a first annular groove which opens onto the base portion of the housing, a part of said first member's base portion being positioned spaced from said second member's base portion and cooperating therewith to provide a second annular groove which opens onto the aperture through the sealing assembly, and an elastic sealing ring provided in each of said annular grooves, said sealing ring in said first annular groove having a sealing engagement with the base portion of the housing and said sealing ring in said second annular groove providing a connection between said sealing assembly and a member passed therethrough whereby both move in unison.

3. A sealing unit comprising a generally cup-shaped housing having a centrally apertured base portion, a centrally apertured sealing assembly disposed within said housing and movable therein, and a centrally apertured cover member to maintain said sealing assembly within said housing, said sealing assembly comprising a generally cup-shaped member having a centrally apertured base portion and an annular wall portion, a ring member having a centrally apertured base portion and an annular wall portion which wall portion is disposed within said generally cup-shaped member and positioned spaced from said cup-shaped member's annular wall portion and cooperates therewith to form a first annular groove which opens onto the base portion of the housing, a part of said cup-shaped member's base portion being positioned spaced from said ring member's base portion and cooperating therewith to provide a second annular groove which opens onto the aperture through the sealing assembly, and an elastic sealing ring provided in each of said annular grooves, said elastic sealing ring in said first groove lying adjacent said housing base portion and adapted to be pressed into sealing engagement therewith and said elastic sealing ring in said second annular groove connecting said sealing assembly to an actuating member passed therethrough whereby both move in unison.

4. A sealing unit comprising a generally cup-shaped housing having a centrally apertured base portion, a centrally apertured sealing assembly disposed within said housing adapted to have a limited axial movement therein toward and away from said base portion and also adapted to move transversely and rotatively, and a centrally apertured cover member to maintain said sealing assembly within said housing, said apertures through said housing base portion, sealing assembly and said cover member being in alignment, said sealing assembly comprising a generally cup-shaped member having a centrally apertured base portion and an annular wall portion, a ring member having a centrally apertured base portion and a pair of annular wall portions, one of which wall portions is positioned spaced from said generally cup-shaped member's annular wall portion and cooperates therewith to form a first annular groove which opens onto the base portion of the housing, a part of said generally cup-shaped member's base portion being positioned spaced from said ring member's base portion and cooperating therewith to define the side walls of a second annular groove, the bottom wall of which is formed by one of said annular wall portions of said ring member, said second groove opening onto the aperture through the sealing assembly, and an elastic sealing ring provided in each of said annular grooves, said elastic sealing ring in said first groove lying adjacent said housing base portion and being adapted to be pressed into sealing engagement therewith and said elastic sealing ring in said second annular groove connecting said sealing assembly to an actuating member passed therethrough whereby both move in unison.

5. A sealing unit comprising a generally cup-shaped housing having a centrally apertured base portion, a centrally apertured sealing assembly disposed within said housing and adapted to have a limited axial movement therein toward and away from said base portion and also adapted to move transversely and rotatively, and a centrally apertured cover member to maintain said sealing assembly within said housing, said apertures through said housing base portion, sealing assembly and said cover member being in alignment, said sealing assembly comprising a generally cup-shaped member having a centrally apertured base portion normally positioned parallel to said housing base portion, and an annular wall portion, a ring member having a centrally apertured base portion positioned parallel to said base portion of said generally cup-shaped member and a pair of annular wall portions, one of which wall portions is positioned spaced from said generally cup-shaped member's annular wall portion and cooperates therewith to form a first annular groove which opens onto the base portion of the housing, a part of said generally cup-shaped member's base portion being positioned spaced from said ring member's base portion and cooperating therewith to define the side walls of a second annular groove, the bottom wall of which is formed by one of said annular wall portions of said ring member, said second groove opening onto the aperture through the sealing assembly, and an elastic sealing ring provided in each of said annular grooves, said elastic sealing ring in said first groove lying adjacent said housing base portion and being adapted to be pressed into sealing engagement therewith and said elastic sealing ring in said second annular groove connecting said sealing assembly to an actuating member passed therethrough whereby both move in unison.

6. A sealing unit comprising a generally cup-shaped housing having a centrally apertured base portion, a centrally apertured sealing assembly disposed within said housing and rotatively and transversely movable therein, and a centrally apertured cover member to maintain said sealing assembly within said housing, said sealing assembly comprising a first member having a centrally apertured base portion and an annular wall portion, a second member having a centrally apertured annular base portion and a peripheral channel portion comprising a pair of spaced annular wall portions, one of which wall portions is positioned spaced from said first member's annular wall portion and cooperates therewith to form a first annular groove which opens onto the base portion of the housing, a part of said first member's base portion being positioned spaced from said second member's base portion and parallel thereto and cooperating therewith to provide a second annular groove which opens onto the aperture through the sealing assembly, and an elastic sealing ring provided in each of said annular grooves, said sealing ring in said first annular groove having a sealing engagement with the base portion of the housing and said sealing ring in said second annular groove providing a connection between said sealing assembly and a member passed therethrough whereby both move in unison.

7. A sealing unit comprising a generally cup-shaped housing having a centrally apertured base portion, a centrally apertured sealing assembly disposed within said housing and adapted to have a limited axial movement therein toward and away from said base portion and also adapted to move transversely and rotatively, and a centrally apertured flat cover member, disposed parallel to said housing base portion, to maintain said sealing assembly within said housing, said apertures through said housing base portion, sealing assembly and said cover member being in alignment and with the aperture through said sealing assembly being of smaller diameter than said other apertures, said sealing assembly comprising a generally cup-shaped member having a centrally apertured base portion normally positioned parallel to said housing base portion and an annular wall portion, a ring member having a centrally apertured base portion positioned parallel to said base portion of said generally cup-shaped member and a peripheral channel portion comprising a pair of spaced annular wall portions, one of which wall portions is positioned spaced from said generally cup-shaped member's annular wall portion and cooperates therewith to form a first annular groove which opens onto the base portion of the housing, a part of said generally cup-shaped member's base portion being positioned spaced from said ring member's base portion and parallel thereto and cooperating therewith to define the side walls of a second annular groove, the bottom wall of which is formed by one of said annular wall portions of said channel member, said second groove opening onto the aperture through the sealing assembly, and an elastic sealing ring provided in each of said annular grooves, said elastic sealing ring in said first groove lying adjacent said housing base portion and adapted to be pressed into sealed engagement therewith and said elastic sealing ring in said second annular groove connecting said sealing assembly to an actuating member passed therethrough whereby both move in unison.

8. A sealing unit comprising a generally cup-shaped housing having a centrally apertured base portion, a centrally apertured sealing assembly disposed within said housing and movable therein, and a central apertured cover member to maintain said sealing assembly within said housing, said sealing assembly comprising a first member having a centrally apertured annular base portion and a peripheral channel portion, the annular walls of which effects an annular groove opening into said cover member, a second member having a centrally apertured base portion and a peripheral channel portion comprising a pair of spaced annular wall portions, one of which wall portions is positioned spaced from an annular wall provided by the channel portion on said first member and cooperates therewith to form an annular groove which faces oppositely to said first mentioned groove and opens into the base portion of the housing, a part of said first member's base portion being positioned spaced from said second member's base portion and cooperating therewith to provide an annular groove which opens onto the aperture through the sealing assembly, and an elastic sealing ring provided in each of said annular grooves, said sealing ring in said first mentioned annular groove having a sealing engagement with said cover member, said sealing ring in said annular groove which opens onto the base portion of the housing having a sealing engagement with said base portion, and said sealing ring in said annular groove opening onto the aperture through the sealing assembly providing a connection between said sealing assembly and a member passed therethrough whereby both may move in unison.

9. A sealing unit comprising a generally cup-shaped housing having a centrally apertured base portion, a centrally apertured sealing assembly disposed within said housing and adapted to have a limited axial movement therein toward and away from said base portion and adapted also to move transversely and rotatively, and a centrally apertured cover member, disposed parallel to said housing base portion, to maintain said sealing assembly within said housing, said sealing assembly comprising a generally cup-shaped member having a centrally apertured annular base portion and a peripheral channel portion, the annular walls of which effect an annular groove which opens onto said cover member, a ring member having a centrally apertured base portion and a peripheral channel portion comprising a pair of spaced annular wall portions, one of which wall portions is positioned spaced from an annular wall provided by the channel portion on said generally cup-shaped member and cooperates therewith to form an annular groove which opens onto the base portion of said housing, a part of said generally cup-shaped member's base portion being positioned spaced from said ring member's base portion and cooperating therewith to provide an annular groove which opens unto the aperture through the sealing assembly, and an elastic sealing ring provided in each of said annular grooves, with said elastic sealing ring in said annular groove opening into the aperture through the sealing assembly connecting said sealing assembly to an actuating member passing therethrough whereby both are movable in unison, with said elastic sealing ring in said groove facing the cover member lying adjacent said cover member and being adapted to be pressed into sealing engagement therewith, and with said elastic sealing ring in said groove facing the housing base portion lying adjacent thereto and being adapted to be pressed into sealing engagement therewith.

ERIC G. HONKANEN.

REFERENCES CITED

The following references are of record in the file of this patent:

UNITED STATES PATENTS

| Number | Name | Date |
|---|---|---|
| 1,220,155 | Fraser | Mar. 20, 1917 |
| 1,262,172 | Coughling | Apr. 9, 1918 |
| 1,989,110 | Penniman | Jan. 29, 1935 |

FOREIGN PATENTS

| Number | Country | Date |
|---|---|---|
| 290,008 | Italy | of 1931 |
| 4,858 | Netherlands | of 1920 |